(12) United States Patent
Hummel et al.

(10) Patent No.: US 10,332,645 B2
(45) Date of Patent: Jun. 25, 2019

(54) METHOD AND DEVICE FOR STORING CONTAINERS HAVING AN ENCAPSULATED FUEL ROD OR A FUEL ROD SECTION

(71) Applicant: FRAMATOME GMBH, Erlangen (DE)

(72) Inventors: Wolfgang Hummel, Neumarkt (DE); Egon Neubauer, Forchheim (DE); Werner Hoefers, Erlangen (DE); Klaus Kurzer, Igensdorf-Etlaswind (DE)

(73) Assignee: Framatome GmbH, Erlangen (DE)

( * ) Notice: Subject to any disclaimer, the term of this patent is extended or adjusted under 35 U.S.C. 154(b) by 56 days.

(21) Appl. No.: 15/432,964

(22) Filed: Feb. 15, 2017

(65) Prior Publication Data
US 2017/0154690 A1 Jun. 1, 2017

Related U.S. Application Data

(60) Division of application No. 14/474,448, filed on Sep. 2, 2014, now Pat. No. 9,916,912, which is a
(Continued)

(30) Foreign Application Priority Data

Mar. 2, 2012 (DE) .......................... 10 2012 203 347
Jun. 20, 2012 (DE) .......................... 10 2012 210 409
Jul. 10, 2012 (DE) .......................... 10 2012 212 006

(51) Int. Cl.
*G21F 5/008* (2006.01)
*G21C 19/32* (2006.01)
(Continued)

(52) U.S. Cl.
CPC ............. *G21F 5/008* (2013.01); *G21C 19/26* (2013.01); *G21C 19/32* (2013.01); *G21F 5/12* (2013.01);
(Continued)

(58) Field of Classification Search
CPC ........ G21C 19/06; G21C 19/07; G21C 19/32; G21F 5/008; G21F 5/012;
(Continued)

(56) References Cited

U.S. PATENT DOCUMENTS 4,197,467 A    4/1980   Williams
4,474,727 A *  10/1984  Kmonk .................... G21F 5/008
                                                    206/443
(Continued)

FOREIGN PATENT DOCUMENTS

DE        2854358 A1    6/1979
DE        3028884 A1    2/1982
(Continued)

*Primary Examiner* — Sharon M Davis
(74) *Attorney, Agent, or Firm* — Laurence A. Greenberg; Werner H. Stemer; Ralph E. Locher

(57) ABSTRACT

A method for encapsulating a fuel rod or a fuel rod section in a container includes inserting the fuel rod or fuel rod section into the container. One of the ends of the container is connected to a purging-gas line. The container is dehydrated and purged by use of a purging gas. The ends of the container are connected to a bypass line in such a way that a closed gas circuit is produced and a hot gas is circulated in the gas circuit until the absolute moisture content reaches an end value at which the absolute moisture content no longer rises. The container is disconnected from the gas circuit and subsequently the container is closed in a fluid-tight manner at both ends.

3 Claims, 6 Drawing Sheets

Related U.S. Application Data continuation of application No. PCT/EP2013/053989, filed on Feb. 28, 2013.

(51) Int. Cl.
| | |
|---|---|
| *G21C 19/26* | (2006.01) |
| *G21F 5/12* | (2006.01) |
| *F26B 21/04* | (2006.01) |
| *F26B 25/06* | (2006.01) |
| *F26B 25/22* | (2006.01) |
| *F26B 21/00* | (2006.01) |

(52) U.S. Cl.
CPC ............... *F26B 21/00* (2013.01); *F26B 21/04* (2013.01); *F26B 25/06* (2013.01); *F26B 25/22* (2013.01); *G21Y 2004/504* (2013.01)

(58) Field of Classification Search
CPC ........... G21F 2005/125; G21F 2005/10; G21F 2005/12; G21F 7/065; G21F 7/066
See application file for complete search history.

(56) References Cited

U.S. PATENT DOCUMENTS

| | | | |
|---|---|---|---|
| 4,987,313 A | 1/1991 | Baatz et al. | |
| 5,550,882 A | 8/1996 | Lehnrt et al. | |
| 5,787,688 A * | 8/1998 | Peulve | G21F 5/12 53/404 |
| 7,096,600 B2 | 8/2006 | Singh | |
| 7,210,247 B2 | 5/2007 | Singh | |
| 7,707,741 B2 | 5/2010 | Singh | |
| 8,130,895 B2 | 3/2012 | Veron | |
| 2008/0056935 A1 | 3/2008 | Singh | |
| 2009/0158614 A1 | 6/2009 | Singh et al. | |

FOREIGN PATENT DOCUMENTS

| | | |
|---|---|---|
| DE | 3222764 A1 | 12/1983 |
| DE | 19640393 A1 | 4/1998 |
| DE | 102010036373 B3 | 1/2012 |
| DE | 102012201131 B3 | 3/2013 |
| EP | 1248270 A1 | 10/2002 |
| EP | 1600982 A2 | 11/2005 |
| GB | 2096389 B | 1/1985 |
| JP | H08507382 A | 8/1996 |
| JP | 2007507701 A | 3/2007 |
| JP | 2007225524 A | 9/2007 |
| JP | 2009501899 A | 1/2009 |
| JP | 2009156625 A | 7/2009 |
| WO | 2010084122 A1 | 3/1998 |

* cited by examiner

METHOD AND DEVICE FOR STORING CONTAINERS HAVING AN ENCAPSULATED FUEL ROD OR A FUEL ROD SECTION

CROSS-REFERENCE TO RELATED APPLICATION

This is a divisional application of U.S. patent application Ser. No. 14/474,448, which is a continuation application, under 35 U.S.C. § 120, of international application No. PCT/EP2013/053989, filed Feb. 28, 2013, which designated the United States; this application also claims the priority, under 35 U.S.C. § 119, of German patent application No. 10 2012 203 347.5, filed Mar. 2, 2012, German patent application No. 10 2012 210 409.7, filed Jun. 20, 2012 and German patent application No. 10 2012 212 006.8, filed Jul. 10, 2012; the prior applications are herewith incorporated by reference in their entireties.

BACKGROUND OF THE INVENTION

Field of the Invention

The invention relates to a method and device for storing containers having an encapsulated fuel rod or a fuel rod section.

For transportation and/or storage purposes, defective fuel rods or fuel rod sections are inserted in vacuum-tight and fluid-tight fashion into containers or capsules such as are known for example from German patent DE 196 40 393 B4, from published, European patent application EP 1 248 270 A1, from European patent EP 1 600 982 B1, and from international patent disclosure WO 2010/084122 A1. Since the encapsulation of a fuel rod or of a fuel rod section is performed as close as possible to the original storage location, that is to say underwater within the fuel element storage basin, it is inevitable that water infiltrates into the open container during the insertion of the fuel rod or fuel rod section. The water must however be removed from the fuel rod container because, owing to decay heat, the water would evaporate and lead to an inadmissibly high internal pressure. For this reason, the closure elements used in the containers known from German patent DE 196 40 393 B4, from published, European patent application EP 1 248 270 A1 and from European patent EP 1 600 982 B1 have a duct via which gas can be injected such that the water situated in the container is expelled. In the case of the closure plugs known in each case from German patent DE 196 40 393 B4 and from published European patent application EP 1 248 270 A1, a coaxial duct is provided in each closure plug, in which coaxial duct there is arranged a spring-loaded valve which, by way of a closing element, closes the duct in fluid-tight fashion. For the expulsion of the water, the closing elements are raised from their valve seat by a ram, and via a duct that is then opened, a gas is injected and the water is expelled via the likewise open duct of the oppositely situated closure element. In the case of the two known containers, the expulsion of the water takes place when the closure elements are, as a result of a screwing, welding or deformation process, situated in their final assembled position in which they close the container in fluid-tight fashion.

In the container known from European patent EP 1 600 982 B1, a closure element is provided which can be screwed onto an external thread of the container and in which a sealing element is mounted in an axially displaceable fashion. In an intermediate position of the closure element, in which the closure element is not yet fully tightened, a parting joint exists between the sealing surface of the sealing element and the face surface, which interacts with the sealing surface to form a sealing pairing, of the hollow cylindrical container part, which parting joint communicates with a lateral ventilation opening in the closure element and, in the intermediate position, fluidically connects the exterior to the scavenging chamber of the hollow cylindrical container part.

In the case of the container known from international patent disclosure WO 2010/084122 A1, there is provided as a closure element a cap which is pushed onto a hollow cylindrical container part and connected to the face surface thereof in cohesive fashion. The closure of the container is performed in a fluid-tight chamber. Before the closure, that is to say when the cap has not been mounted onto the hollow cylindrical container part, the liquid situated in the chamber is drawn out, and a vacuum-drying process is subsequently performed. Owing to the fact that, within the container equipped with a fuel rod, narrow gaps are present between the fuel rod and the internal wall of the container, it is in some circumstances possible for residual water to remain in the container.

For the encapsulation of fuel rods or fuel rod sections for relatively long-term temporary storage, residues of water in the container represent a considerable problem. The water must not exceed a predefined amount, generally 1 g. With the known methods, however, it is not possible to make quantitative statements regarding the total content of residual water remaining in the fuel rod capsule even after a vacuum drying process.

SUMMARY OF THE INVENTION

The invention is therefore based on the problem of specifying a method for the encapsulation of a fuel rod or of a fuel rod section, in which method the fuel rod or fuel rod section is enclosed in a gas-tight manner and in a container, and by the method it is possible to make quantitative statements regarding the content of residual water in the container. The invention is furthermore based on the problem of specifying a device by which a container containing a fuel rod or fuel rod section can be closed with a known content of residual water.

The invention is furthermore based on the objects of specifying a method and a device for the treatment and storage of a multiplicity of containers in which a fuel rod or a fuel rod section is enclosed.

The method for encapsulating a fuel rod or fuel rod section in a container includes the following method steps:
a) inserting the fuel rod or fuel rod section into the container,
b) connecting one of the ends of the container to a scavenging gas line,
c) expelling water from and scavenging the container by way of scavenging gas,
d) connecting the ends of the container to a bypass line such that a closed gas circuit is formed, and circulating a hot gas in the gas circuit until the absolute moisture content reaches a final value at which it rises no further,
e) separating the container from the gas circuit, and
f) subsequently closing the container in fluid-tight fashion at both ends.

The container is preferably scavenged with scavenging gas again before being closed.

If, furthermore, method steps c) and d) are performed one after the other several times in cyclic fashion, wherein method step c) and subsequently method step d) are performed in each cycle, it is possible to reliably attain particularly low threshold values for the moisture content.

In the method for storing containers in which a fuel rod or fuel rod section is encapsulated in each case, the following method steps are carried out:

a) inserting the container into a capsule receptacle which has a multiplicity of spacers in grid form and which is open at a top side,
b) closing the capsule receptacle in fluid-tight fashion by a cover,
c) placing a cap onto the capsule receptacle, which cap projects into the interior of the capsule receptacle and is provided with a suction lance which is fluidically connected to an extraction line guided through the cover,
d) extracting the water situated in the capsule receptacle by way of the suction lance,
e) scavenging the capsule receptacle with scavenging gas,
f) scavenging the capsule receptacle with a heating gas until the absolute moisture content reaches a predefined threshold value, and
g) welding the cap to the capsule receptacle, and welding an opening, which is situated in the cap and which leads to the suction lance, by a welding device mounted in the cover.

It is preferably also the case in this method that method steps e) and f) are performed one after the other several times in cyclic fashion, wherein method step e) and subsequently method step f) are performed in each cycle.

With the foregoing and other objects in view there is provided, in accordance with the invention, a device for the encapsulation of a fuel rod or fuel rod section in a container. The device contains a first and a second chamber. The first and second chambers are arranged spaced apart from one another and on a common system axis. The first and second chambers are provided with a first and second opening, respectively, for receiving a free end, which issues into the chamber, of the container, such that the first and second chambers, when a container is arranged between them, can be fluidically connected to one another exclusively via the container itself. The first chamber is connected to an inlet line and the second chamber is connected to an outlet line for a scavenging gas. The inlet line and the outlet line can be connected to one another, via a bypass line that runs outside the chambers, in such a way that a closed gas circuit is formed, wherein, in the gas circuit, there are arranged a pump and a heating device for respectively circulating and heating a heating gas situated in the gas circuit. Measurement devices are provided for detecting the absolute moisture content of the heating gas flowing from the second chamber into the bypass line are arranged in the gas circuit. Each chamber has means for closing the container.

In an advantageous embodiment, the first and second chambers are rigidly connected to one another along the system axis by a connecting pipe into which the container can be inserted such that it projects by way of its free ends beyond the connecting pipe.

It is provided in particular that, between the container and connecting pipe, there is arranged at least one sealing element which can be set such that the chambers are fluidically connected to one another exclusively via the container.

If an adjustable sealing element is arranged on both ends of the connecting pipe, there is formed between the container and connecting pipe a cylindrical gap chamber which is closed in fluid-tight fashion with respect to the chambers.

With the foregoing and other objects in view there is further provided, in accordance with the invention, a device for the fluid-tight storage of a multiplicity of containers in which a fuel rod or fuel rod section is encapsulated in each case. The device has a capsule receptacle which has a multiplicity of spacers in grid form, a cover for closing, in fluid-tight fashion, the capsule receptacle inserted in the frame, and a suction lance which is guided through the cover and through a cap, which is mounted displaceably in the cover. The suction lance serves for the extraction of water situated in the capsule receptacle. The cover has an inlet and an outlet for a scavenging gas and a heating gas. A measurement device is provided for measuring the absolute moisture content of the heating gas emerging from the container is arranged at the outlet. A device for placing the cap onto and welding the cap to the capsule receptacle are arranged in the cover.

Other features which are considered as characteristic for the invention are set forth in the appended claims.

Although the invention is illustrated and described herein as embodied in a method and a device for encapsulating a fuel rod or a fuel rod section for temporary storage, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
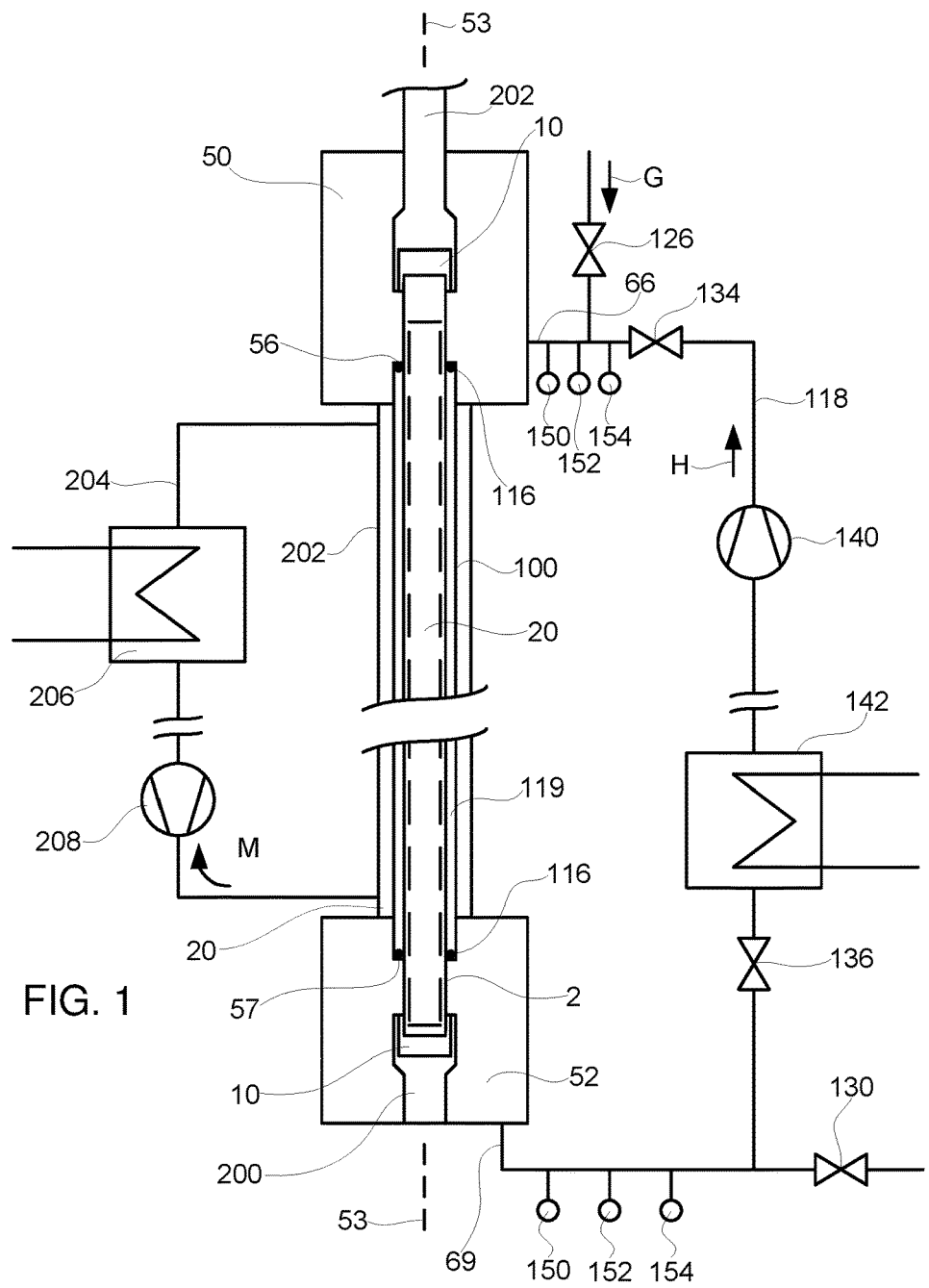
FIG. 1 is a schematic diagrammatic illustration of a device for encapsulating a fuel rod or a fuel rod section according to the invention.

Referring now to the figures of the drawings in detail and first, particularly to FIG. 1 thereof, there is shown a container 2 provided with a fuel rod 20 which has been inserted into a device in which residual water situated in the container 2 is removed from the container 2 and in which the container 2 is closed in gas-tight fashion after the residual water content has been reduced to or below a predefined maximum admissible threshold value. In a preceding working step, the fuel rod 20 shown by dashed lines in FIG. 1 has been inserted into the container 2, onto the ends of which there has been screwed, into an intermediate position, a closure element 10 known for example from European patent EP 1 600 982 B1.

The device contains a first and a second chamber 50, 52 which are arranged spaced apart from one another on a common system axis 53. The first and second chambers 50, 52 are rigidly connected to one another along the system axis 53 by a connecting pipe 100 which is open at both ends. The ends of the connecting pipe 100 form, in the first and second chambers 50, 52, a first and second opening 56, 57 respectively, through which the container 2 that has been inserted into the connecting pipe 100 projects by way of its free ends beyond the connecting pipe 100 into the chambers 50, 52. Between the connecting pipe 100 and the container 2, in the region of the free ends, there are arranged advanceable sealing elements 116 which close a cylindrical gap chamber 119 that is formed between the connecting pipe 100 and container 2, such that the first and second chambers 50, 52, when a container 2 is arranged between them, can be fluidically connected to one another exclusively via the container 2 itself.

In the second chamber 52, the container 2 equipped with the closure element 10 is mounted in a rotationally fixed manner in a receptacle 200 adapted to the closure element 10. Into the first chamber 50 there is inserted a handling tool 202 which engages in torque-locking fashion around the closure element 10 and by which the two closure elements 10 can be screwed to the container 2 into a gas-tight final position.

An inlet line 66 for a scavenging gas G is connected to the first chamber 50, which scavenging gas flows through the container 2 into the second chamber 52 and exits the second chamber via an outlet line 69. The inlet line 66 and outlet line 69 are connected via valves 134 and 136 to a bypass line 118 that runs outside the chambers 50, 52, such that, by closing valves 126 and 130 that are situated in the inlet line 66 and outlet line 69, respectively, for the scavenging gas G, a closed gas circuit is formed whose volume is several times greater than the free volume of the container 2 and is a multiple of the volume, greater than 10 times the volume, in the exemplary embodiment approximately 50 times the volume. In the gas circuit there are arranged a pump 140 and a heating device 142 for circulating and heating, respectively, a heating gas H that is situated in the gas circuit. Also arranged in the gas circuit are measurement devices 150, 152 and 154 by which the temperature, the relative humidity and the pressure, respectively, of the heating gas H flowing into the first chamber 50 and of the heating gas H flowing out of the second chamber 52 can be measured.

The connecting pipe 100 is furthermore surrounded by an outer pipe 202 which is arranged between the chambers 50, 52 and which is connected to a heating circuit 204 in which, likewise, a fluid medium M heated by a heating device 206 is circulated by a pump 208, such that the connecting pipe 100 is thermally insulated with respect to the environment. As an alternative to this, such thermal insulation may also be achieved by the insertion of heat-insulating material or heating elements between the connecting pipe 100 and outlet pipe 202.

The advanceable sealing elements 116 are initially opened, and by injection of scavenging gas G, water is expelled from the processing chambers 50, 52 and the gap chamber 119 via the outlet line 69. Thereafter, the gap chamber 119 is closed by the sealing elements 116, and the water situated in the container 2 between the fuel rod 20 and inner wall of the container 2 is expelled by the scavenging gas G. Thereafter, the valves 126, 130 are closed, and the valves 134 and 136 situated in the bypass line 118 are opened. The heating gas H situated in the bypass line 118 is subsequently circulated continuously in the closed gas circuit. By use of the measurement devices 150, 152 and 154 arranged in each case in the inlet line 66 and in the outlet line 69 in the vicinity of the first and second chambers 50, 52, the temperature, the moisture content and the pressure of the heating gas H flowing in the gas circuit are detected. Using the values for pressure, temperature and relative moisture content measured in the outlet line 69, the absolute water or moisture content in the heating gas H can be determined in kg/m³, and the development thereof over time recorded.

Figure 2:
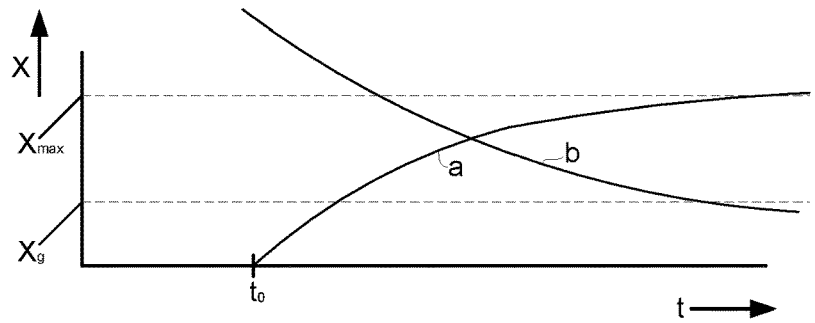
FIG. 2 is a diagram in which a moisture content of a heating gas flowing out of the container or of a capsule receptacle is plotted versus time.

In the diagram of FIG. 2, ab absolute moisture content X is plotted in curve a versus time t. It can be seen from FIG. 2 that, from a time $t_0$ from which the heating gas is circulated in the gas circuit, the absolute moisture content X increases continuously until it reaches a constant final value $X_{max}$ at a plateau. The attainment of the final value $X_{max}$ indicates that the water situated within the closed gas circuit has completely evaporated. In the event that an open fuel rod or open fuel rod sections is/are situated in the container 2, it is furthermore ensured that the water bound in the nuclear fuel has also completely evaporated.

Then, with a known free volume of the container 2 and of the fuel rod 20, it is possible from the final value $X_{max}$ to determine the absolute mass, in grams, of the water vapor situated within the container 2. When the final value $X_{max}$ has been reached, the valves 134 and 136 are closed. The amount of water still situated within the container 2 is thus known. It would basically be possible for the container 2 to subsequently be closed in gas-tight fashion. It is however preferable for the valves 126 and 130 to be opened again, and for the container 2 to be scavenged again with scavenging gas G. In this way, the water vapor situated in the container 2 and in the fuel rod plenums is expelled, such that the amount of water situated within the container 2 is additionally reduced. Accordingly, the predetermined residual amount can be regarded as an upper value greater than the actual residual amount.

Figure 3:
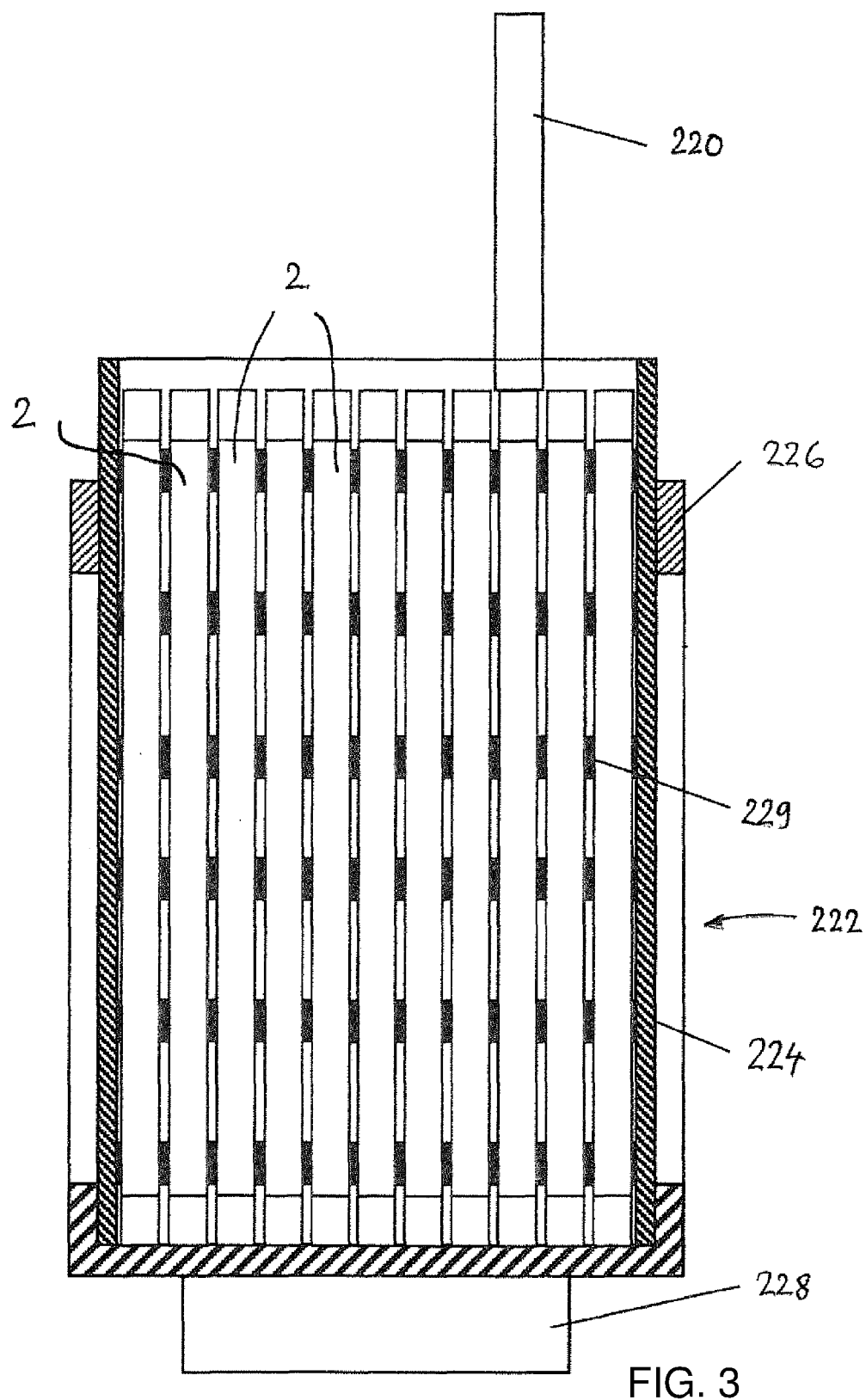
FIGS. 3-7 are illustrations showing the device according to the invention for a fluid-tight storage of a multiplicity of containers in which the fuel rod or the fuel rod section is encapsulated in each case, during the execution of temporally successive working steps.

The container 2 may then be welded to the closure elements 10 or subjected to a further treatment as explained below. In the further treatment, the container 2 is removed from the device and placed, by way of a handling tool 220, into a capsule receptacle 222 which is illustrated in FIG. 3 and which is constructed from a cylindrical receiving tube 224 arranged on a frame 226, the frame having a base part 228. The capsule receptacle 222 is provided for receiving a multiplicity of containers 2. For this purpose, a multiplicity of axially spaced-apart spacers 229 in grid form are arranged in the capsule receptacle 222, the containers 2 being guided in the cells of the spacers.

Figure 4:
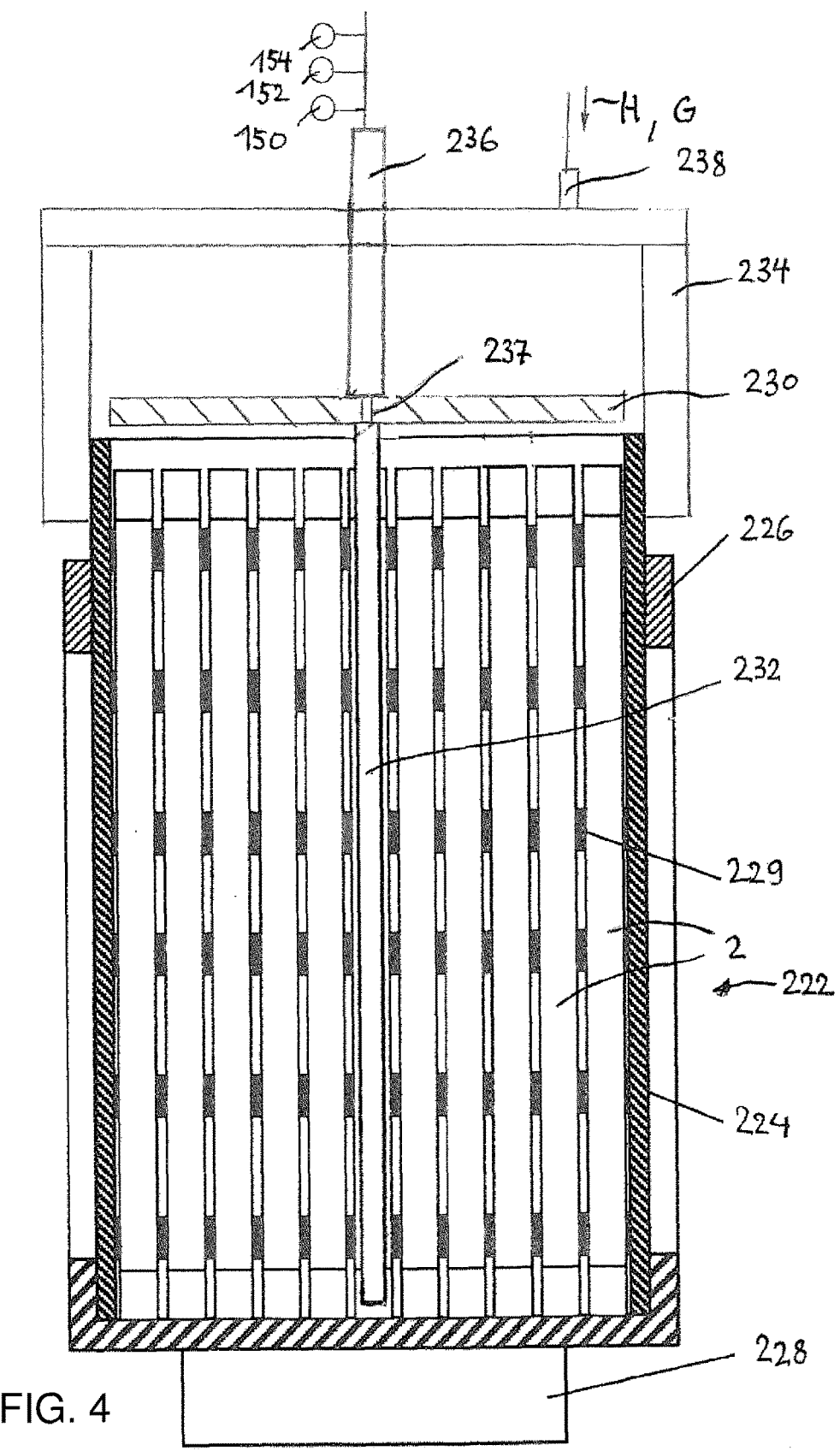

As per FIG. 4, after the capsule receptacle 222 has been filled with the containers 2, there is placed onto the receiving tube 224 a cap 230 which has a central suction lance 232, the latter leading to the base of the capsule receptacle 222 and serving for the extraction of water situated in the capsule receptacle 222. A cover 234 is placed in fluid-tight fashion onto the receiving tube 224, through which cover there leads a suction line 236 which is fluidically connected to the suction lance 232 via an opening 237 situated on the cover 230. Water situated in the capsule receptacle 222 is extracted via the suction line 236, with scavenging gas G being fed in at the same time via an introduction opening 238. Subsequently, heating gas H is supplied via the introduction opening 238 and discharged via the extraction line 236. By contrast to the situation during the drying of the container 2, the heating gas H is not conducted in a closed circuit.

The temperature, relative moisture content and pressure at the outlet are detected by the measurement devices 150, 152 and 154, and from these the present absolute moisture content X is determined, which decreases continuously as the drying process progresses. The profile of the absolute moisture content X with respect to time is illustrated in simplified form by curve b in the diagram of FIG. 2.

The heating gas H is conducted through the capsule receptacle 222 until the absolute moisture content X reaches or falls below a predefined threshold value $X_g$. The profile of the absolute moisture content X with respect to time is illustrated by curve b in the diagram of FIG. 2. It is ensured in this way that the absolute content of water situated in the interior of the capsule receptacle 222 does not exceed predefined maximum values. In this way, it is possible to make reliable statements as regards whether predefined threshold values are adhered to.

Figure 5:
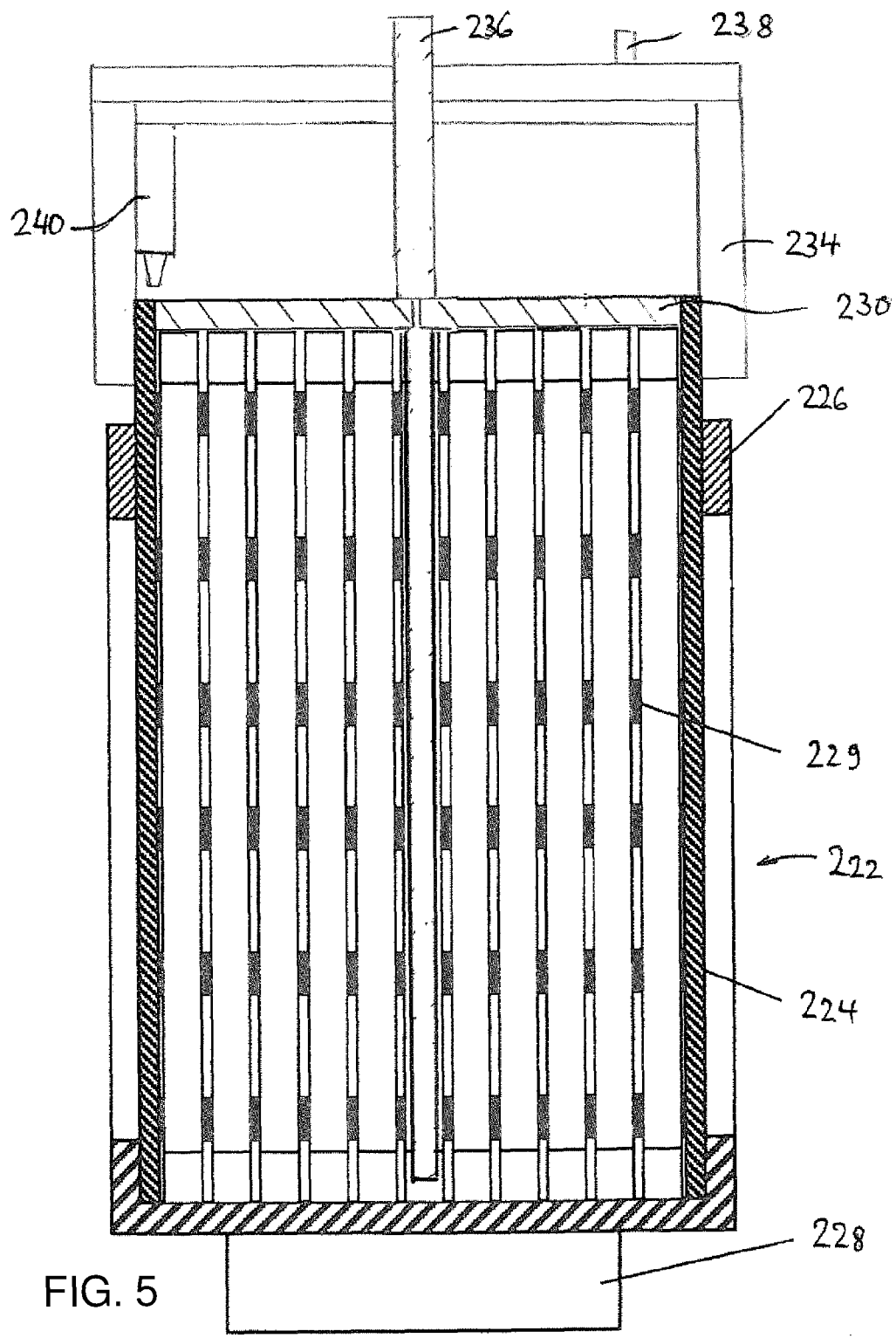

After the drying of the capsule receptacle 222, the cap is, as per FIG. 5, welded to the receiving tube 224 by a welding device 240 which is mounted in the interior of the cover 234 so as to be rotatable about the longitudinal central axis of the receiving tube 224.

Figure 6:
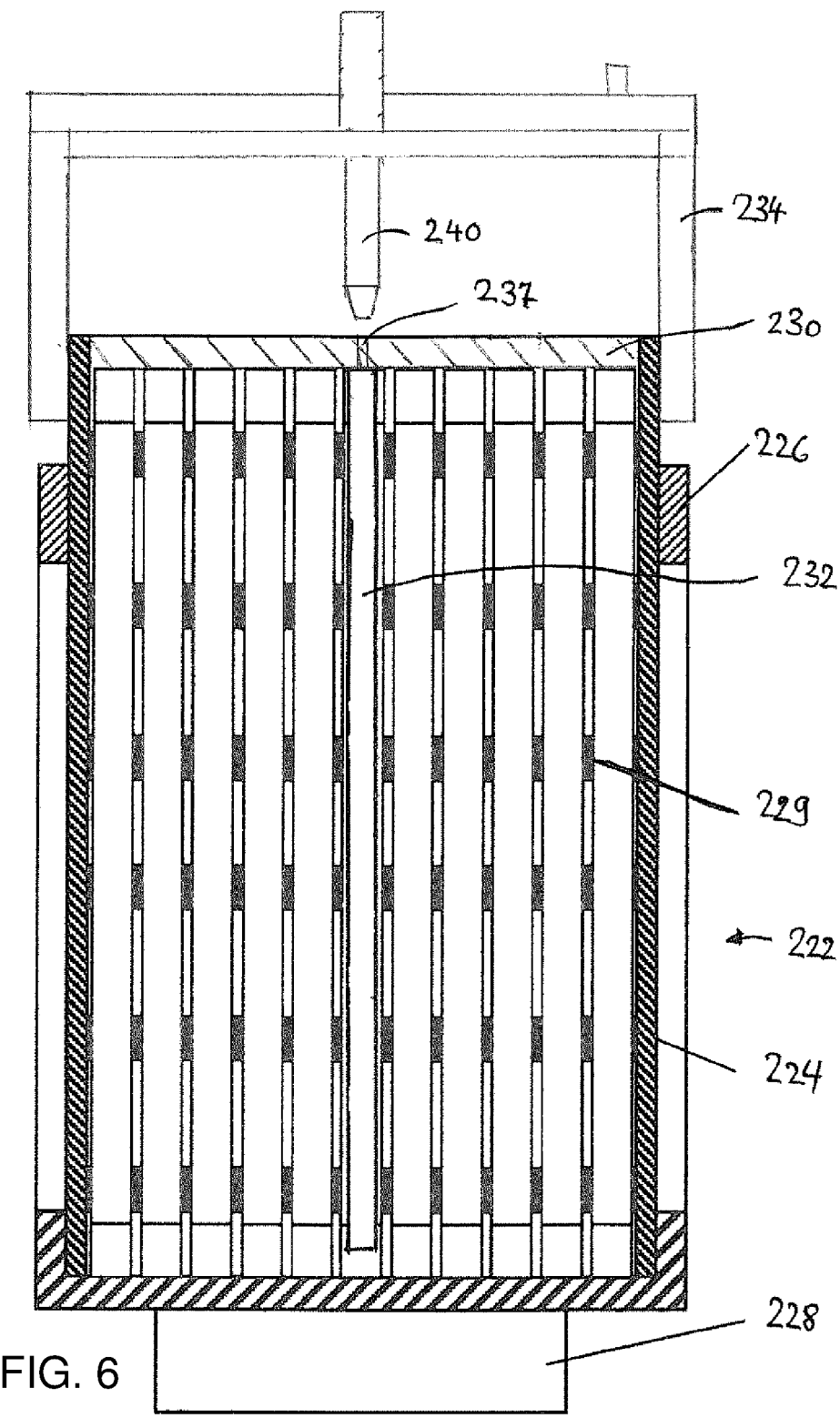

In a subsequent step, as per FIG. 6, the opening 237 to the suction lance 232, the opening being situated in the cap 230, is likewise welded by the welding device 240. In the cover 234 there may additionally be arranged ultrasound checking devices by which the weld seams can be checked.

Figure 7:
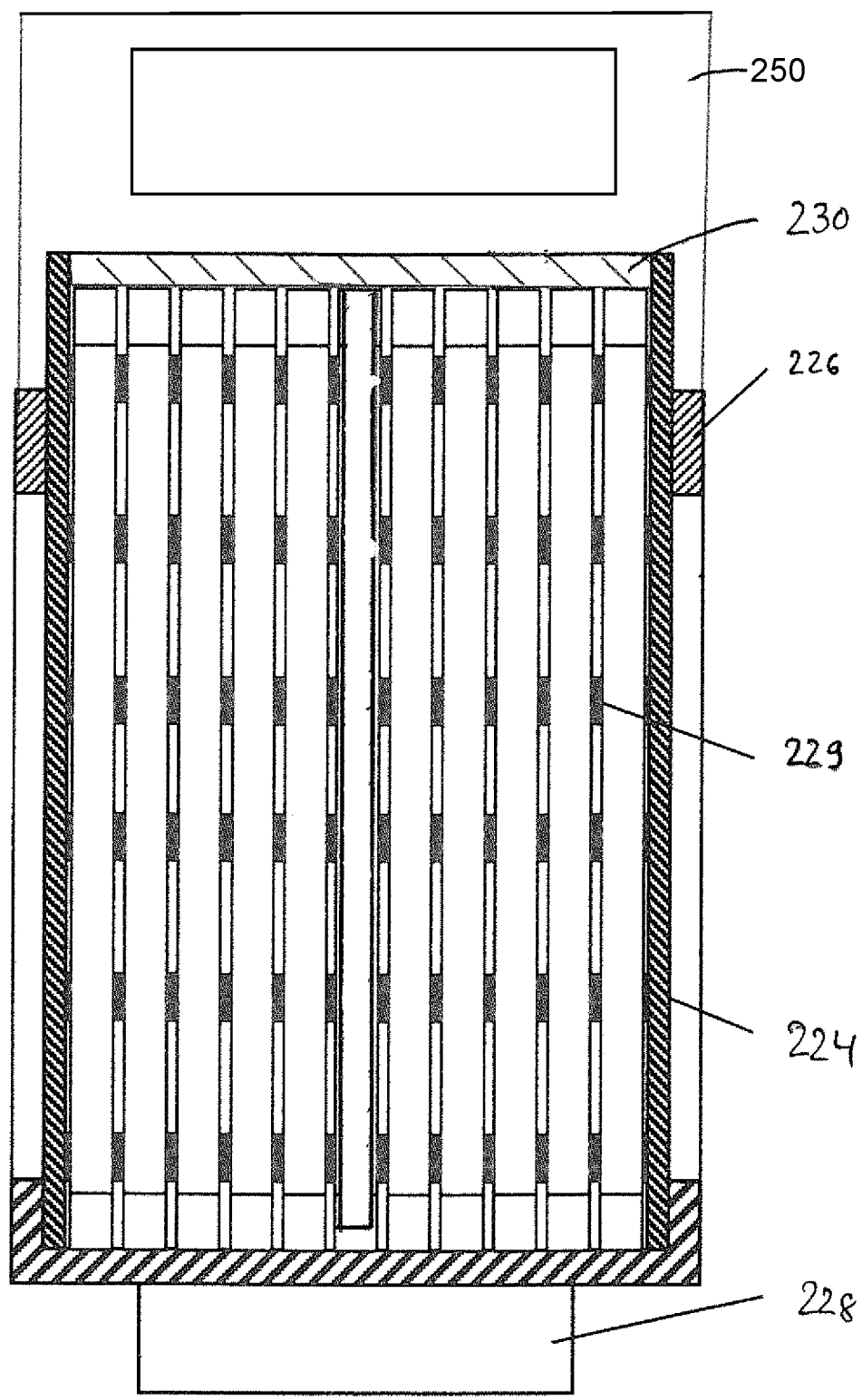

Subsequently, as per FIG. 7, the cover 234 is removed and a transport head 250 is mounted onto the frame 226, which transport head facilitates the transportation of the closed capsule receptacle 222.

Both in the case of the scavenging and drying of the container 2 and in the case of the scavenging and drying of the capsule receptacle 222, these two method steps may be performed several times in cyclic fashion, such that a drying process that has taken place is followed by another scavenging process and subsequently another drying process.

The invention claimed is:

1. A method for storing containers each having a fuel rod or a fuel rod section encapsulated therein, which comprises the steps of:
    a) inserting one of the containers into a capsule receptacle having a multiplicity of spacers defining a grid within the capsule receptacle and a suction lance, the capsule receptacle being open at a top side;
    b) placing a cap onto the open top side of the capsule receptacle, the cap projecting into an interior of the capsule receptacle and having an opening that fluidly connects the suction lance to an extraction line;
    c) closing the capsule receptacle in a fluid-tight manner by means of a cover placed over the cap, the extraction line guided through the cover;
    d) extracting water situated in the capsule receptacle by way of the suction lance, the extracting including introducing a scavenging gas and a heating gas into the capsule receptacle through an inlet in the cover and removing the scavenging gas and heating gas through the suction lance and extraction line;
    e) scavenging the capsule receptacle with the scavenging gas;
    f) scavenging the capsule receptacle with the heating gas until an absolute moisture content reaches a predefined threshold value; and
    g) welding the cap to the capsule receptacle and the opening in the cap by means of a welder mounted inside the cover.

2. The method according to claim 1, which further comprises performing the method steps e) and f) one after the other several times in cyclic fashion, wherein the method step e) and subsequently the method step f) are performed in each cycle.

3. A device for a fluid-tight storage of a multiplicity of containers in which a fuel rod or a fuel rod section is encapsulated in each of the containers, the device comprising:
    a capsule receptacle having a multiplicity of spacers defining a grid within said capsule receptacle, said capsule receptacle having an open top side;
    a cover for closing said capsule receptacle in a fluid-tight manner;
    a cap mounted in said cover onto said open top side of said capsule receptacle;
    a suction lance guided through said cover and through said cap and into said capsule receptacle, said suction lance serving for extracting water situated in said capsule receptacle;
    said cover having an inlet for introducing a scavenging gas and a heating gas into said capsule receptacle;
    a relative humidity meter for measuring an absolute moisture content of the heating gas emerging from the device and disposed downstream of said suction lance; and
    a welder for welding said cap to said capsule receptacle, said welder disposed inside said cover.

* * * * *